United States Patent [19]

Kondo et al.

[11] 4,393,365

[45] Jul. 12, 1983

[54] METHOD AND SYSTEM FOR FORECASTING AND WARNING ON AUTOMOTIVE ABNORMALITIES

[75] Inventors: Nobuo Kondo, Anjo; Masanori Naganoma; Hitoshi Hibi, both of Kariya; Tetsuo Fujii, Toyohashi; Kunihiko Suzuki, Kariya, all of Japan

[73] Assignee: Nippondenso Co., Ltd., Kariya, Japan

[21] Appl. No.: 279,710

[22] Filed: Jul. 2, 1981

[30] Foreign Application Priority Data

Jul. 7, 1980 [JP] Japan .................................. 55-92924

[51] Int. Cl.³ ............................................. B60Q 5/00
[52] U.S. Cl. ..................................... 340/57; 340/52 F; 340/59; 340/75; 340/526; 340/692
[58] Field of Search ............... 340/52 D, 52 F, 57, 340/59, 75, 526, 589, 692

[56] References Cited

U.S. PATENT DOCUMENTS 3,582,949  6/1971  Forst ............................... 340/692 X
3,879,704  4/1975  Noji ................................. 340/692 X
4,184,146  1/1980  Fratzke et al. ..................... 340/52 F

FOREIGN PATENT DOCUMENTS 2714621  10/1978  Fed. Rep. of Germany .

*Primary Examiner*—David L. Trafton
*Attorney, Agent, or Firm*—Cushman, Darby & Cushman

[57] ABSTRACT

An automotive abnormality forecasting and warning method and system for issuing a voice and visual alarm when a signal representing the condition of an automotive inspection item exceeds a predetermined value, which comprise steps of calculating the cooling water temperature change rate in variable cycles, determining a calculation cycle corresponding to the detected water temperature and the calculated change rate from a memory storing the cooling water temperature, water-temperature-change rate and calculation cycle in a predetermined relation, judging whether the detected water temperature and the calculated change rate are in a predetermined water overheat region, and issuing a voice alarm on an overheating trend in response to more than a predetermined number of the judging operations.

10 Claims, 5 Drawing Figures

METHOD AND SYSTEM FOR FORECASTING AND WARNING ON AUTOMOTIVE ABNORMALITIES

The present invention relates to a method and a system for giving an alarm or warning on an abnormality of an item of inspection of a running automobile.

In conventional systems of this type, the condition of an item of inspection of an automobile is detected, and when the detected condition reaches an abnormal level, a corresponding alarm lamp is lit or a buzzer is made to sound. In the case of an item of inspection such as an engine overheat which is gradually aggravated until an abnormally overheated state is reached, however, the abnormality will be reduced effectively if the driver is warned by the forecasting and prediction thereof before the abnormal condition actually occurs.

The present invention has been developed in view of this fact, and a first object thereof is to provide an automotive warning method in which a forecasting calculation and a display are made to predict an abnormality when an inspection item is gradually changing toward such an abnormality, and when the particular condition further changes and reaches an abnormal state, a voice warning is issued. The driver is thus warned against an abnormality before hand. In this way, the generation of such an abnormality is reduced or prevented on the one hand and the driver is informed of the occurrence of an abnormality by a warning alarm on the other hand.

A second object of the present invention is to provide an automotive warning system for embodying the above-mentioned warning method.

The above and other objects, features and advantages will be made apparent by the detailed description taken in conjunction with the accompanying drawings, in which.

The present invention will be described below with reference to an embodiment shown in the attached drawings.

Figure 1:
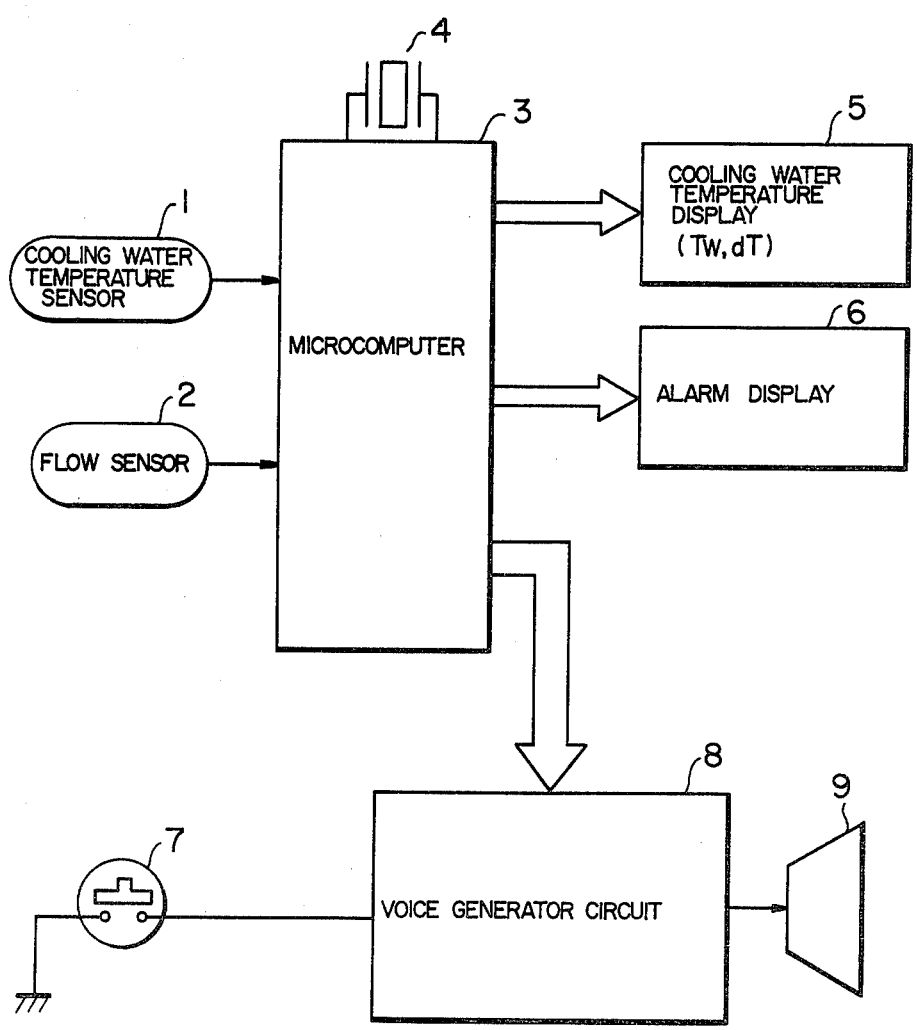
FIG. 1 is a diagram showing a general configuration of an embodiment of the present invention.

A general configuration of the embodiment under consideration is shown in FIG. 1. Reference numeral 1 designates a water temperature sensor for detecting the temperature of the cooling water for cooling the automobile engine, and numeral 2 designates a flow sensor arranged in the circulation path of the cooling water for detecting the presence or absence of the flow thereof.

Numeral 3 designates a single-chip microcomputer for performing a digital operation process according to a control method including a predetermined alarm control method. This microcomputer makes up control means connected with a crystal oscillator 4 of several MHz and is actuated in response to a stabilization voltage of 5 V from a stabilization power supply circuit (not shown) which in turn is actuated by power supplied from an automobile-carried battery. The microcomputer 3 performs the calculation processes in response to the detection signals from the water temperature sensor 1 and the flow sensor and produces command signals for effecting various controls of water temperature display, alarm display and a voice alarming.

This microcomputer 3 is comprised of a one-chip large scale integration circuit (LSI) comprising the essential parts of a read-only memory (ROM) for storing a control program including an alarm control program for determining a calculation process, a central processing unit (CPU) for sequentially reading the control program from the read-only memory and executing the calculation processes associated therewith, a random access memory (RAM) for temporarily storing various data on the calculations of the central processing unit and capable of reading the data through the central processing unit, a clock generator section having a crystal oscillator 4 for generating reference clock pulses for the above-mentioned various calculations, an analog-digital converter section for converting an analog signal into a digital signal, and an input-output circuit for regulating the input and output of the various signals.

Numeral 5 designates a water temperature indicator for holding the display command signal from the microcomputer 3 and digitally displaying the water temperature data Tw and the water temperature increase rate dT based on the detection signal from the water temperature sensor 1.

Numeral 6 designates an alarm indicator for holding the alarm display command signal from the microcomputer 3 and visually warning the unsatisfactory circulation of the cooling water, overheating or an overheating trend which provides a prediction of an overheated condition.

Numeral 7 designates a manual switch which, when closed, generates a stop signal thereby to stop the voice alarm.

Numeral 8 designates a voice generator circuit which stores in words a first voice alarm "COOLING WATER NOT WELL CIRCULATED," a second voice alarm "OVERHEATED" and a third voice alarm "OVERHEATING." In response to a voice alarm command signal from the microcomputer 3, the voice generator circuit 8 issues a voice alarm of corresponding words by way of loud speaker 9, and stops issuing the voice alarm by the stop signal from the manual switch 7.

The voice generator circuit 8 and the speaker 9 make up a voice generator. This technique is identical with the "Voice Synthesis by PARCOR System" carried in the journal "Densi-Gijutsu (Electronics)" Vol. 21, No. 12, p.p. 46 to p.p. 49.

The operation of the system according to the invention configured as above will be described with reference to the calculation flowcharts of FIGS. 2 and 3 and the characteristic diagrams of FIGS. 4 and 5.

Figure 2:
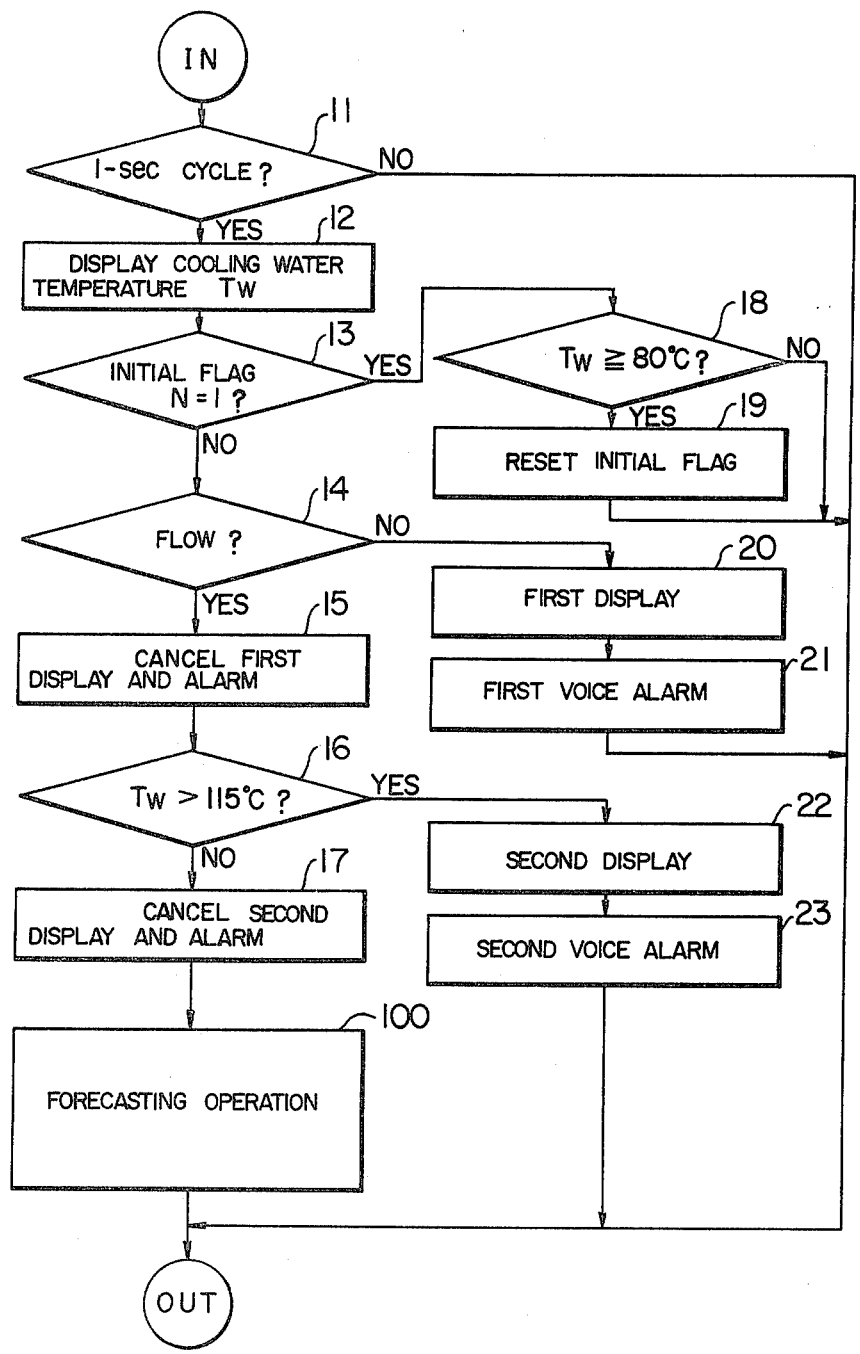
FIG. 2 is a calculation flowchart showing the calculation processes of a microcomputer shown in FIG. 1.
Figure 3:
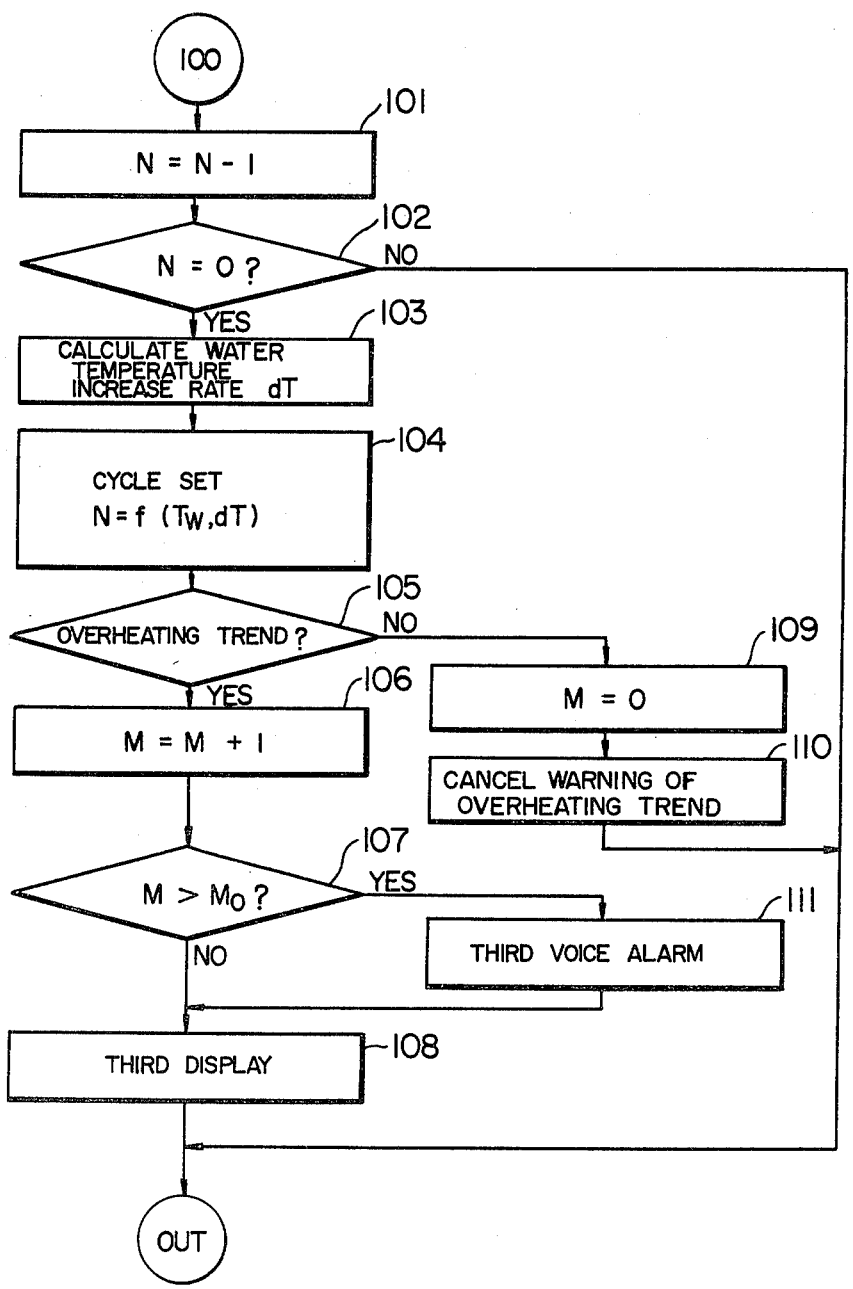
FIG. 3 is a calculation flowchart showing detailed calculation processes of a forecasting calculation routine in FIG. 2.

A calculation process according to the alarm control method is shown in FIG. 2, and a detailed calculation process of the forecasting calculation routine of FIG. 2 is shown in FIG. 3.

First, the key switch for starting the automobile engine is turned on thereby to actuate the microcomputer 3. Since the temperature of the engine cooling water is low, the microcomputer 3, through the initialization process for starting the calculation, sets the initial flag and initializes the process in various ways including $N = 1$, followed by repeated calculations at time intervals of several hundred msec. When the calculation reaches the alarm control program, the decision at the 1-sec cycle decision step 11 in FIG. 2 changes from "No" to "Yes" at intervals of 1 second, followed by transfer to the water temperature display step 12 where the display command signal of the water digital temperature data Tw obtained by A/D conversion on the basis of the detection signal from the water temperature sensor 1 is applied to the water temperature indicator 5.

As a result, the water temperature indicator 5 holds the water temperature data Tw and digitally displays the same until the next calculation which is to be made 1 second later.

At the same time the calculation is transferred from the initial flag decision step 13 to the water temperature decision step 18, where the answer is "No" since it is still immediately before operation start, followed by the transfer to "Out." Subsequently, the calculations from the 1-sec cycle decision step 13, the water temperature display step 12, the initial flag decision step 13, the water temperature decision step 18 to "Out" are repeated at intervals of 1 second.

When the temperature of the engine cooling water gradually rises and reaches 80° C. with the progress of the operation of the automobile, the answer to the question of whether $Tw \geq 80°$ C. at the water temperature decision step 18 in the above-mentioned repeated calculations is reversed from "No" to "Yes," followed by the transfer to the initial flag cancellation step 19 where the initial flag is cancelled, further followed by transfer to "Out."

In the calculation one second later, the decision at the initial decision step 13 changes from "Yes" to "No," and a calculation different from the above-mentioned repeated calculation is executed. In this case, if the circulation of the cooling water is stopped, the stop signal is produced from the flow sensor 2, so that the decision at the flow decision step 14 is "No," followed by the transfer to the first display step 20 and the first voice alarm step 21. As a result, the first display alarm signal is applied to the alarm indicator 6 for alarm display, while at the same time applying the first voice alarm command signal to the voice generator circuit 8, thus issuing a voice alarm "COOLING WATER NOT WELL CIRCULATED" from the speaker 9.

In the case where the cooling water is circulated, on the other hand, the flow detection signal is produced from the flow sensor 2. Thus the decision at the flow decision step 14 is "Yes," and therefore the first display and the first voice alarm are cancelled at the first cancellation step 15, followed by transfer to the overheat decision step 16. Since the water temperature just reached 80° C., the decision at the step 16 is "No," followed by transfer through the second cancellation step 17 to the forecasting calculation routine 100. Subsequently, at time intervals of 1 second, the calculations of the 1-sec cycle decision step 11, the water temperature display step 12, the initial flag decision step 13, the flow decision step 14, the first cancellation step 15, the overheat decision step 16, the second cancellation step 17 and the forecasting calculation routine 100 are repeated followed by transfer to "Out."

At the forecasting calculation routine 100 in the repeated calculation, the subtraction $N = N - 1$ is first made in the subtraction step 101 as shown in FIG. 3, and when the answer is "Yes" at the $N = 0$ decision step 102 indicating that it is the time to calculate the temperature change rate, transfer is made to the water temperature change rate or increase rate calculation step 103 thereby to determine the water temperature increase rate dT from the preceding time point of $N = 0$. The water temperature increase dT may be calculated by the equation below by using the period N set at the step 104, water temperature value Twi and Twe detected respectively at the beginning of and at the end of the period N.

$$dT = (Twe - Twi)/N$$

Figure 4:
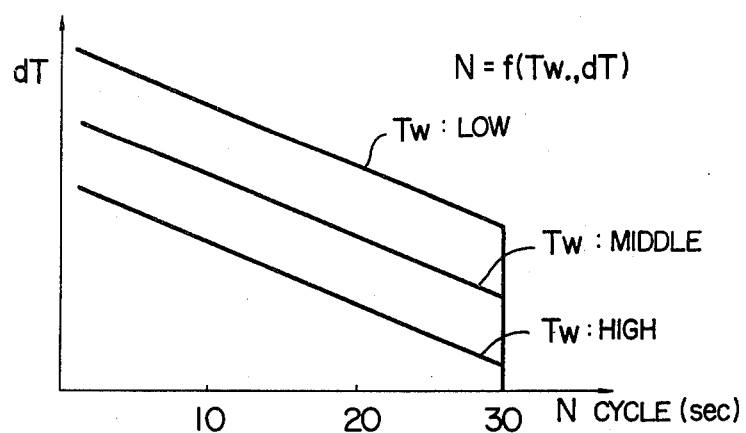
FIG. 4 shows a relation between temperature increase rate and calculation cycle.

The display command signal for displaying the calculation value dT is applied to the water temperature indicator 5 where the increase rate dT is displayed, while at the same time transferring to the period setting step 104 where the period N based on the water temperature Tw and the increase rate dT is determined according to the characteristic of FIG. 4 stored in the first memory of the microcomputer. This cycle or period N indicating the period of time to be elapsed before the change rate dT is calculated next time at the step 103 is determined in such a manner that the higher the water temperature Tw or the increase rate dT, the period N is shorter, and this period N is associated with the answer "Yes" at the $N = 0$ decision step 102 in the forecasting calculation routine 100.

Figure 5:
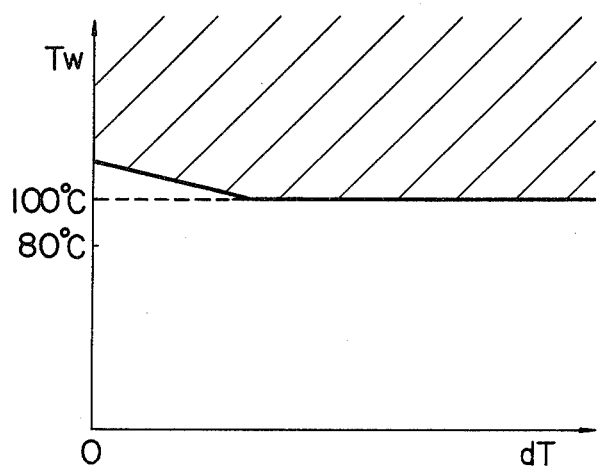
FIG. 5 is a characteristic diagram showing an overheated trend region.

The process is then passed to the overheating trend decision step 105, where it is decided whether or not the detection value Tw and the temperature increase rate dT are located in the hatched region of the characteristic diagram of FIG. 5 by reference to the second memory of the microcomputer which stores the relation between the water temperature increase rate and the water temperature under the water overheated condition as shown by the hatched region of FIG. 5. If the answer at the step 105 is "No," operand M is reset to 0 at the M reset step 109, and transfer is made to the third cancellation step 110. If the answer at the overheating trend decision step 105 is "Yes," by contrast, the process is passed to the addition step 106 where the addition $M = M + 1$ is executed so that the number of consecutive decisions of "Yes" at the overheating trend decision step 105 is counted, followed by the transfer to the M decision step 107. Until the number M of calculations at the M decision step 107 reaches Mo, the relation $M > Mo$ at the M decision step 107 is denied and the transfer is made to the third display step 108 where the third display command signal is held by the alarm indicator 6, thereby indicating the likeliness of overheating as a predication of an overheated condition.

When the number M of calculations for the overheating trend exceeds the set number Mo, on the other hand, the decision at the M decision step 107 is "Yes," and transfer is made to the third voice alarm step 111, where the third voice alarm command signal is applied to the voice generator circuit 8 thereby to generate the voice alarm "ENGINE BEING OVERHEATED" from the speaker 9.

If the engine overheating trend continues and the cooling water temperature Tw exceeds 115° C., the decision at the overheat decision step 16 in the repeated calculations of FIG. 2 changes from negation to affirmation of the relation $Tw > 115°$ C., followed by transfer to the second display step 22, where the second display command signal is applied to the alarm indicator 6 thereby to indicate an overheated condition, and the process is further passed to the second voice alarm step 23, where the second voice alarm command signal is applied to the voice generator circuit 8, so that the voice alarm "OVERHEATED" is issued from the speaker 9.

In this way, the temperature of the cooling water is detected, and when the water temperature is lower than a setting, the increase rate thereof is calculated, so that on the basis of the increase rate and the water temperature, the abnormality of the engine overheating trend is forecast thereby to issue an alarm by display, thus warning the driver of an overheating condition. The driver is thus in a position to take actions to reduce the abnormality involved at an early time. Further, when an overheated condition is reached, it is not only displayed but also a voice warning of "OVERHEATED" is issued, thus increasing the effect of warning of the driver.

In stopping the voice alarm, the manual switch 7 is closed and thus the operation of the voice generator circuit 8 is stopped.

In the above-mentioned embodiment, the temperature of the engine cooling water is detected to issue an overheat warning. Instead, a discharge warning based on the detection of a voltage of the automobile-mounted battery or a reduced air pressure or puncture warning based on the detection of the tire air pressure may be issued.

It will be understood from the foregoing description that according to a first embodiment of the present invention calculations are made for forecasting including the rate of change of an inspection item undergoing a gradual change toward an abnormality and the result of the calculation is used to make a predictive display thereby to give an early warning to the automobile driver. In this way, the driver is in a position to take an early preventive action to reduce or prevent the abnormality. Further, the great advantage of the present invention is that if the abnormality occurs, the driver is informed of the same by a voice alarm in addition.

According to another aspect of the present invention, there is provided an automobile alarm system for properly carrying out the above-mentioned automobile alarm method.

We claim:

1. An automotive abnormality forecasting and warning method comprising the steps of:
   detecting the condition of an inspection item of the automobile and generating a detection signal according to said condition;
   generating an alarm display and a voice alarm on said abnormal item in response to a decision that said detection signal has exceeded a predetermined value;
   calculating the change rate of said detection signal when said detection signal is smaller than the predetermined value; and
   forecasting an abnormality and displaying an alarm on the basis of the trend of deterioration of the inspection item by the use of said change rate and said detection signal.

2. A method according to claim 1, further comprising an overheating trend detection step of detecting the temperature of the cooling water, calculating the rate of change of the detected water temperature, and judging whether said detected water temperature and said change rate are included in a predetermined pattern of an overheat condition.

3. A method according to claim 2, further comprising steps of making said decision at regular intervals of time, issuing a visual warning against an overheat condition until a judgment is made a predetermined number of times that said detected water temperature and said change rate are included in said predetermined pattern, and issuing a voice warning when the number of times of said judgment exceeds said predetermined value.

4. A method according to claim 2 or 3, further comprising steps of calculating the change rate of the temperature of the cooling water at regular intervals of time, and determining the cyclical interval of calculation corresponding to the calculated change rate from a relation between water-temperature, water-temperature-change rate and calculation cycles stored in advance in such a manner that the higher the water temperature and the water temperature change rate, the smaller the calculated cycles.

5. An automotive abnormality forecasting and warning system comprising:
   sensor means for detecting the condition of an automobile inspection item and generating a detection signal;
   control means including first means for generating a first alarm command signal when said detection signal exceeds a predetermined value, means for calculating the change rate of said detection signal, and abnormality forecasting means for generating a second alarm command signal when forecasting an abnormality by the use of said detection signal and said calculated change rate;
   alarm display means for displaying an alarm in response to said first alarm command signal; and
   voice alarm generator means for issuing a voice alarm in response to said second alarm command signal.

6. An automotive abnormality forecasting and warning system according to claim 5, wherein said sensor means includes a water temperature sensor for generating a cooling water temperature indication signal and a flow sensor for generating a cooling water circulating condition indication signal, said alarm display means includes at least one of visual display means and voice alarm generator means.

7. An automotive abnormality forecasting and warning system comprising:
   a water temperature sensor for detecting the temperature of the cooling water and generating a water temperature indication signal;
   water temperature judging means including means for fetching the water temperature indication signal periodically, means for detecting that the water temperature indication signal has exceeded a predetermined value and generating a water temperature alarm signal, and means for calculating the change of water temperature in variable calculation cycles, said calculator means including means for calculating the rate of water temperature change in given one of variable cycles in accordance with the difference in the detected water temperature between the beginning and the end of said cycle, first memory means for storing a relation between water temperature, water temperature-change rate and calculation cycle in such a manner that the higher the water-temperature and the water-temperature-change-rate, the smaller the calculation cycle, second memory means for storing a relation between water-temperature and water-temperature-change-rate in a predetermined water-overheat region, means for determining a calculation cycle corresponding to the calculated water temperature change rate and the detected water temperature indication signal on the basis of the signal from said first memory means, overheating trend detecting means for comparing the detected water temperature and the calculated change rate with those in said predetermined water overheat region and issuing an overheating trend alarm signal when said detected water temperature and said calculated change rate are included in said region, said overheating trend detecting means issuing a cancellation signal when said detected water temperature and said calculated change rate are not included in said region, visual alarm means for issuing an alarm on an overheating trend in accordance with less than a predetermined number of overheat trend alarm signals generated, and voice alarm means for issuing a voice alarm on an overheating trend in response to the generation of the overheating trend alarm signals in a number not less than the predetermined number;

first display means for displaying an alarm in response to said water temperature alarm signal; and second display means for displaying an alarm in response to said overheating trend alarm signal.

8. A system according to claim 7, wherein said first display means and said second display means include at least voice alarm generator means.

9. A system according to claim 7, wherein said first display means and said second display means include visual display means and voice alarm generator means respectively.

10. A system according to any one of claims 7 to 9, further comprising a flow sensor and means for displaying an alarm in accordance with said water temperature alarm signal when the cooling water is not circulating.

* * * * *